United States Patent [19]

Wilderman et al.

[11] Patent Number: 5,143,768
[45] Date of Patent: Sep. 1, 1992

[54] LAMINATED DIEBOARD STRUCTURE

[75] Inventors: Ronald C. Wilderman, Sumner; David W. Park, Puyallup, both of Wash.

[73] Assignee: Weyerhaeuser Company, Tacoma, Wash.

[21] Appl. No.: 753,113

[22] Filed: Aug. 30, 1991

[51] Int. Cl.$^5$ .............................................. B32B 1/04
[52] U.S. Cl. ..................................... 428/68; 76/107.8; 76/DIG. 6; 428/71; 428/73; 428/284; 428/421; 428/422; 428/425.1; 428/318.4
[58] Field of Search .............. 428/318.4, 309.9, 317.1, 428/317.7, 314.4, 314.8, 68, 71, 73, 421, 422, 284, 425.1; 76/107.8, DIG. 6

[56] References Cited

U.S. PATENT DOCUMENTS

| | | | |
|---|---|---|---|
| 3,666,593 | 5/1972 | Lee | 156/285 |
| 3,699,202 | 10/1972 | Verbestel | 264/109 |
| 3,863,550 | 2/1975 | Sarka et al. | 83/694 |
| 4,162,877 | 7/1979 | Nyberg | 425/84 |
| 4,344,798 | 8/1982 | Gaul et al. | 106/123 |
| 4,359,507 | 11/1982 | Gaul et al. | 428/425 |
| 4,361,662 | 11/1982 | Gaul et al. | 524/14 |
| 4,414,361 | 11/1983 | Gaul et al. | 524/702 |
| 4,486,557 | 12/1984 | Gaul et al. | 523/446 |
| 5,008,359 | 4/1991 | Hunter | 428/535 |

FOREIGN PATENT DOCUMENTS 0304273  2/1989  European Pat. Off. .

OTHER PUBLICATIONS

Gaul et al., *Proceedings of the S.P.I. International Technical/Marketing Conference*, pp. 399–407 (1983).
U.S. patent application Ser. No. 07/680,810, entitled "A Multi-Functional Exterior Structural Foam Sheeting Panel."
U.S. patent application Ser. No. 07/618,723, entitled "Isocyanate Modified Cellulose Products and Method for Their Manufacture."

*Primary Examiner*—James J. Bell
*Attorney, Agent, or Firm*—Klarquist, Sparkman, Campbell, Leigh & Whinston

[57] ABSTRACT

This invention is directed to a dieboard comprising a rigid core of a plastic material, such as polyurethane, having a polyurea-cellulose composite secured to its opposed major surfaces. The polyurea-cellulose composite imparts substantial dimensional stability to the laminated dieboard. A layer of a liquid impermeable material, such as a film, can be secured to the outer major surfaces of the dieboard. By making this outer layer of a light color, such as white, the projection of CAD or hand-drawing slotting templates onto the dieboard surface is facilitated.

21 Claims, 1 Drawing Sheet

LAMINATED DIEBOARD STRUCTURE

TECHNICAL FIELD

This invention is directed to a dieboard structure and more specifically to a laminated dieboard structure comprising a rigid core of a plastic material having a polyurea-cellulose composite secured to at least one of the opposed major surfaces of the core.

BACKGROUND OF THE INVENTION

There are a variety of uses for dies that punch shaped holes and cut or form sheets from materials such as metal, cardboard and other stock. Dieboards which are slotted to receive and rigidly retain steel rule are in particular demand.

Dies have been described in previously issued U.S. patents. For example, U.S. Pat. No. 3,863,550 describes a die having a superimposed pair of metal or rigid plastic plates separated by an intermediate semirigid plastic material. The plates are coated with a light-sensitive compound to form a "resist layer" that is resistant to chemical etching materials such as nitric acid. A solubilizing agent removes the resist layer in appropriate areas indicated by a slotting template which is transferred onto the resist layer using photographic negatives. The dieboard is then slotted to receive rule by applying a chemical etching material. The superimposed metal or plastic plates of the dieboard described in this patent are expensive and chemical etching is relatively slow and costly.

Dieboards with a white finish, such as acrylic are known to facilitate projection or drawing of slotting templates onto the dieboard.

Because slotting can be accomplished more rapidly, lasers appear to be the fastest growing method of cutting dieboards. Lasers are currently being used to slot hardwood dieboards, such as of maple or birch. Due to their lack of dimensional stability, hardwood dieboards constitute the low performance and low cost end of the commercial market for dieboards. Lasers have also been used to cut plywood dieboards; however, the heat generated by the lasers often results in warping such dieboards.

Lasers have also been used to cut "PERMAPLEX" dieboards, which are made from a polyester-cellulose blend by EHV Weidmann of St. Johnsbury, Vt. PERMAPLEX boards are expensive. Also, these dieboards can only be slotted at a relatively slow rate using lasers.

Polyurea-cellulose composites are known in the art, but have not heretofore been recognized as being suitable for use in a dieboard structure. For example, U.S. Pat. No. 5,008,359, issued Apr. 16, 1991 to Frank Hunter and owned by the assignee of the present application describes such a polyurea composite material. This patent is incorporated herein by reference in its entirety and describes a polyurea-cellulose composite formed by impregnating cellulose sheet material with from about 8% to about 20% of a substantially uncatalyzed, polyisocyanate resin and thereafter curing this material under suitable conditions of moisture content, pressure and temperature.

The polyurea-cellulose composite described in the above patent has been used to form a sheathing panel as described in pending U.S. patent application entitled "A Multi-Functional Exterior Structural Foam Sheathing Panel," Ser. No. 07/680,810, filed Mar. 22, 1991. The sheathing panel comprises a foam core sheet of from one to four pounds per cubic foot density laminated with the polyurea-cellulose composite sheets. The sheathing panel application specifically calls for composite sheets of from about $8 \times 10^{-3}$ to about 0.1 inches in thickness. This structure, because of its low density core, would not be suitable for a dieboard.

There is therefore a need for dimensionally stable, high-performance dieboards produced from inexpensive materials such as polyurea-cellulose composites. There is also a need for dieboards that can be slotted at a rapid rate, such as using lasers.

SUMMARY OF THE INVENTION

The present invention is directed to a dieboard comprising a polyurea-cellulose composite secured to at least one of the opposed major surfaces of a plastic core material. Preferably a respective one such cover sheet is secured to each major surface of the core. A layer of light-colored surface forming material, such as a film, may be positioned on the exposed surface of the cover sheet to facilitate drawing or projection of slotting templates onto the exposed dieboard surface. A film or other coating is preferably liquid or water vapor impermeable material to prevent moisture from entering into the dieboard and causing warpage thereof.

A variety of polyurea-cellulose composites are suitable for use as cover sheets in the present invention. The polyurea-cellulose composite may, for example, comprise sheets of substantially delignified cellulosic material, such as wood pulp, impregnated with from about 8% to about 30% w/w of a polyisocyanate resin. The resin is then cured under suitable conditions of heat, pressure and moisture content, such as described in the aforesaid U.S. Pat. No. 5,008,359 to Hunter, to form the polyurea-cellulose composite. The polyisocyanate resin may also be diluted with a miscible organic solvent, such as propylene carbonate that comprises up to about 20% by weight of the polyisocyanate. The resin impregnating the cellulosic material may be cured by densifying the composite structure with a heated press until a composite core temperature typically between 200° F. and 350° F. is obtained. This latter process is described in U.S. patent application Ser. No. 07/275,824, filed Nov. 25, 1988, to Hunter, et al., entitled "Isocyanate Modified Cellulose Products and Method for their Manufacture". This application is owned by the assignee of the present invention and is incorporated herein by reference.

Higher resin loading levels (up to about 30% w/w and higher relative to the mass of cellulosic material) can be used, particularly, for example, if the core temperature of the polyurea-cellulose composite is cooled to about 100° F. to about 175° F. before the densifying pressure is released. This cooling technique is described in a co-pending U.S. patent application Ser. No. 07/752,821, entitled "Polyurea-Cellulose Composites and Methods for their Manufacture" to Lincoln, et al., filed on the same day as this application, owned by the assignee of the present application, and incorporated herein by reference. Polyurea-cellulose composites made according to this Lincoln et al. process typically exhibit exceptional dimensional stability parameters, especially in the Z-direction.

The polyisocyanate binders used to impregnate the cellulosic material can be selected from a variety of materials or mixtures thereof. The preferred polyisocyanate is poly(diphenylmethane diisocyanate "PMDI").

A number of organic solvents can be used as a diluent for the polyisocyanate, although the preferred solvent is propylene carbonate. The cellulosic material is typically pulp cellulose fibers, chemical pulps, thermomechanical pulps, bleached and unbleached paper and paper-like materials, non-woven mats, sheets, and felts.

The polyurea-cellulose-plastic core laminated dieboard of the present invention has excellent dimensional stability and can be slotted at commercially viable rates with lasers or saws (e.g. jig saws) known in the art. For instance, a dieboard made according to the present invention can be slotted at a rate of up to 35 inches per minute or higher using conventional lasers.

DETAILED DESCRIPTON OF THE PREFERRED EMBODIMENTS

Figure 1:
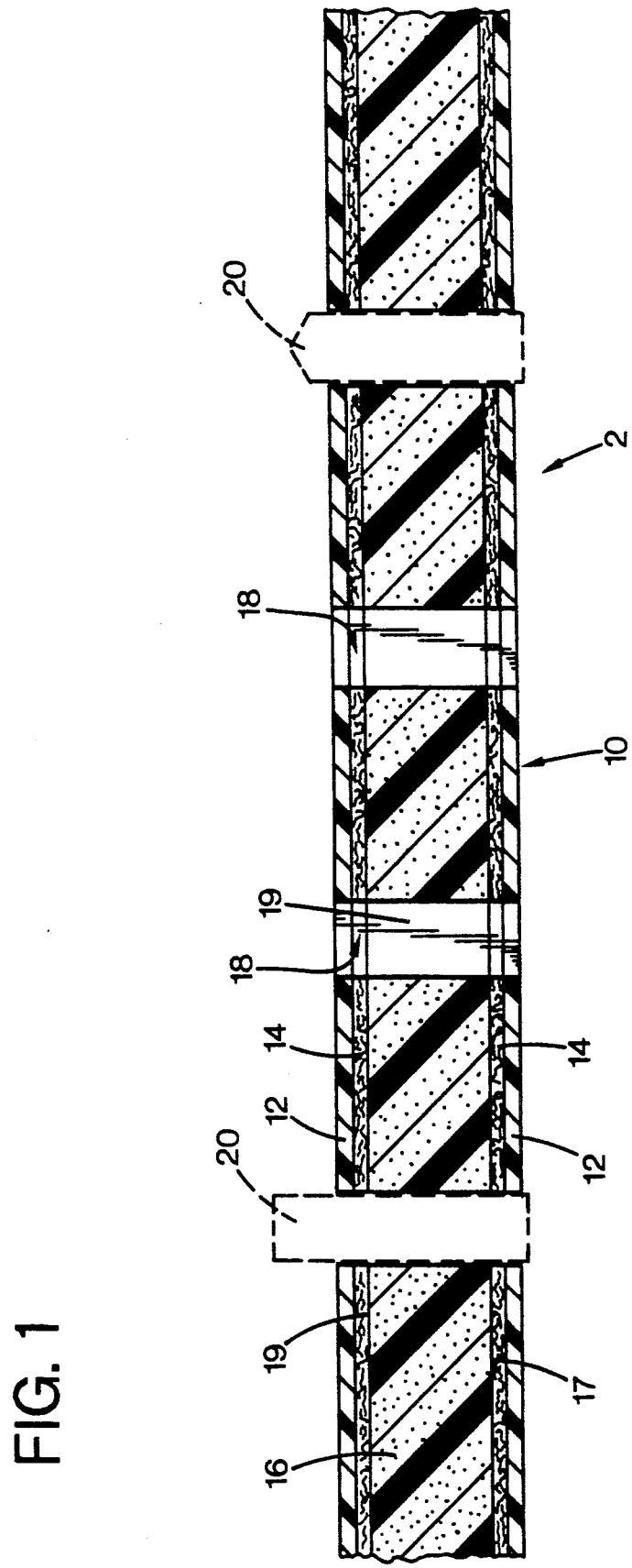
FIG. 1 is a side sectional view of a dieboard of the present invention.

FIG. 1 shows a die 2 comprising dieboard 10 and rigid rule 20. Dieboard 10 has a rigid core 16 of a plastic material, such as a foamed polyurethane. Other core materials may also be used. However, for dimensional stability for use as a dieboard the core should be a high density core having a density ranging from about ten to about thirty pounds per cubic foot. For ease of cutting with a laser while still providing excellent dimensional stability, a most preferred core density is about fifteen pounds per cubic foot. Rigid core 16 has two opposed major surfaces, 17, 19. FIG. 1 shows the core 16 between a pair of cover sheets 14. Although only one major surface of the core need be covered by a cover sheet to provide a functional dieboard, preferably a respective cover sheet is laminated to each of the major core surfaces to provide a strong balanced structure, each side of which may be selected for slotting or notching as explained below. The cover sheets 14 each comprise a layer of a polyurea-cellulose composite. The indivdual cover sheets 14 may be formed of a single ply or plural plies of resin impregnated cellulosic sheet stock as explained below.

Although variable, for effective cutting with a laser, the cover sheets preferably range in thickness from about 0.075 inch to about 0.2 inches with a most preferred thickness being from about 0.1 to about 0.15 inch.

FIG. 1 also shows an optional surface forming material, such as indicated by layer 12 in FIG. 1, positioned on the exposed outer surface of the cover sheets 14. The surface forming material is preferably liquid and water vapor impermeable so as to block or inhibit the passage of moisture into the dieboard surface, which could cause the dieboard to warp or otherwise distort. The surface forming material typically provides a high degree of visual contrast to an image (e.g. a die forming template) projected or drawn onto the surface for subsequent use in guiding the cutting of the dieboard structure, as by a laser. Preferably the surface is a light color, meaning tan or lighter, and most preferably white to provide a high level of contrast to a drawn or projected image when the drawn or projected image is dark. Conversely, a dark surface layer 12, such as black, may be used if the projected image is of a lighter color. The layer may comprise a coating applied to one or both of the cover sheets following the manufacture of the dieboard, such as formed by spraying or otherwise applying a liquid coating material to the cover sheet. Alternatively, the layer 12 may comprise a sheet secured, as by adhesive, to the cover sheet. The layer 12 may also comprise a film, such as a polyvinyl fluoride film, which is adhered to the dieboard by the heat and pressure applied during curing of the cover sheets. One specifically preferred material is a substantially white film material sold under the brand name Tedlar by DuPont Corporation. Again, the layer 12 may be formed in any convenient manner and form a projection surface which facilitates projection of CAD or drawing of hand-lay-out slotting templates onto the surface of the dieboard structure. Although variable, the film 14 typically is of a thickness within the range of from about 0.001 to about 0.003 inch, with a preferred thickness of about 0.0015 inch.

The cover sheet material comprising layer 14 is a polyurea-cellulose composite typically produced from substantially delignified cellulosic material. Delignified cellulose is defined herein as cellulose having most to substantially all the indigenous lignin and analogous naturally-occurring binders removed. The cellulosic material typically comprises cellulose fibers such as pulped fibers, "chemical pulps," "thermomechanical pulps," recycled pulp fiber, bleached and unbleached paper and paper-like materials, non-woven mats, sheets or felts, and the like.

A specifically preferred cellulosic material is "kraft linerboard," which is a paper-like board made according to the kraft (sodium sulfate) method of paper making. Kraft linerboard sheets are manufactured in a number of basis-weight grades, ranging from about 30 pound basis weight (30 lb/1000 ft$^2$) to about 90 pound basis weight (90 lb/1000 ft$^2$).

The cellulosic material preferably includes a small amount of moisture, up to about 10% w/w relative to the mass of cellulose. This moisture level is normal with cellulosics because of their hydrophilic nature and promotes the curing of polyisocyanate resin into a polyurea material under the application of heat and pressure.

The substantially delignified cellulosic material may be impregnated with an isocyanate resin in a known manner. However, although variable, a preferred resin impregnation amount, or "loading level," is from about 8% to about 30% w/w relative to the mass of the cellulose. The polyisocyanate resin comprises at least one di- or polyfunctional isocyanate. These polyisocyanates can be applied as a substantially uncatalyzed, neat binder. A catalyst may also be used.

The polyisocyanate resin may also comprise at least one polyisocyanate compound diluted with an organic solvent miscible with the polyisocyanate. The preferred polyisocyanate compound, whether applied neat or diluted, is poly(diphenylmethane diisocyanate) (herein referred to as "PMDI"), such as PAPI-2027 available from Dow Chemical Corporation, Midland, Michigan. PMDI is a partially polymerized, or "oligomerized," material. Other organic polyisocyanates are also usable, simply by virtue of such compounds possessing at least two isocyanate groups per molecule. Di- or polyfunctional isocyanate molecules are required because they can react to form crosslinked polymeric materials. Additional candidate polyisocyanates include lower ($C_1$–$C_{12}$) aliphatic, alicyclic and aromatic polyisocyanates.

The preferred solvent used as a diluent for the polyisocyanate is propylene carbonate. Other organic solvents can be used. Alternative solvents include, but are not limited to, aromatics such as benzene, halogenated benzenes, nitrobenzenes, alkyl benzenes such as toluene and xylenes, halogenated lower aliphatics, ethers, ketones, alkyl acetates, and other alkylene carbonates.

Up to about 20% w/w solvent in the resin, relative to the polyisocyanate, confers surprisingly improved mechanical properties to the polyurea-cellulose composite, compared to similar composites made using "neat" polyisocyanate. Solvent amounts greater than 20% w/w can yield a composite exhibiting an unacceptably high degree of water-absorption. About 20% w/w solvent is regarded herein as the practical upper limit. About 5% w/w is regarded as the practical lower limit.

It is not entirely clear what role the organic solvent plays in conferring improved mechanical properties to the composite. Perhaps the addition of a low-viscosity solvent reduces the viscosity of the relatively viscous polyisocyanate and thus improves penetration of the resin into the cellulosic material. The solvent may also confer benefits due to solvation effects which, in turn, enhance the reactivity of the polyisocyanate. Propylene carbonate may serve as a co-polymerizable reactant with the polyisocyanate. This solvent can react with organic polyisocyanates in the presence of a catalyst to form isocyanurates.

The resin is preferably prepared and cured without an added catalyst. However, a catalyst can be added without departing from the principles of the present invention. If used, the catalyst can be selected from a variety of catalysts used for isocyanate polymerizations including, without limitation, tertiary amines, aliphatic metal complexes, and acetyl acetonates.

The polyisocyanate resin is applied to the cellulosic material in any manner to achieve satisfactory cellulose-fiber impregnation The resin is typically applied to the cellulosic material by spraying, dipping, rolling, or other suitable process known in the art. Satisfactory resin-impregnation of kraft linerboard sheets results in a resin loading of about 10–30% w/w relative to the mass of the linerboard. The resin loading of 58- and 69-lb linerboards is consistently about 15–16% when applied using a Gravure roll-coater apparatus known in the art.

The polyisocyanate resin impregnating the cellulose sheet is cured by the simultaneous application of heat and pressure for a time not exceeding about 5 minutes. The curing temperature can be within the range of about 220° F. to about 475° F.; and the pressure within the range of about 130 to about 1200 psig. These ranges of pressure and temperature are selected so as to be sufficient to effect polymerization of the polyisocyanate to form polyurea and at the same time to effect possible covalent bonding of the polyisocyanate molecules to the cellulose molecules.

In a specifically preferred approach for making the cover sheets, the core temperature of the polyurea-cellulose composite is cooled (e.g. to below the vapor pressure of water) before the densifying pressure is released. Typically, higher loading levels of resin can be used when the press is held closed until the temperature drops. For example, about 30% w/w or more of the polyisocyanate is typically used.

In this case, a pressure of from about 300 psig to about 1200 psig, with a preferred pressure of about 800 psig, is used to densify the resin-impregnated cellulosic material. The press may be preheated to a temperature within the range from about 325° F. to about 400° F. with a preferred temperature being about 350° F. Alternatively, the press can be heated to the target range while the resin-cellulose composite is being densified.

The cellulosic material is densified and heated for a period of time sufficient to raise the center or core of the cellulosic material to a temperature of from about 275° F. to about 400° F. The core is defined as the plane of symmetry between two heated press platens which defines the midpoint of materials placed in the press opening for densification. The preferred core curing temperature is about 350° F. The press is then cooled until a core temperature of from about 100° F. to about 170° F., with a preferred temperature of about 150° F., is reached before the applied pressure is released.

The press temperature required to cure the polyisocyanate resin is greater than the boiling points of both water, present as residual cellulosic moisture in amounts up to about 10% w/w, and carbon dioxide, which is produced during the polymerization reaction. These two substances are therefore in a gaseous state during the heat-press cycle. The energy and volume change associated with the escape of the water and carbon dioxide gas from the interior of the composite after the densifying pressure is released may reduce the internal bond strength of the composite. The greatest reduction in composite strength is believed to occur in the Z-direction, which is perpendicular to the opposed major surfaces of the resin containing cover sheet material. The vapor pressure of water and carbon dioxide can be reduced by allowing the 25 core temperature to cool to about 100° F. to about 175° F. before the pressure is released.

The vapor pressure can also be reduced by including a "breathing cycle" during the heat-press cycle. The breathing cycle allows water and carbon dioxide vapor to escape by releasing the press pressure for a period of time from about 4 seconds to about 10 seconds after densifying the polyurea-cellulose composite for a period of time not to exceed the polymer cure time. The heat-pressure cycle is then resumed for a period of time sufficient to obtain a core temperature of from about 275° F. to about 400° F.

One ply of the polyurea-cellulose composite can be produced, such as by using the processes described above to cure a single lamina of polyisocyanate-impregnated cellulosic material. Plural ply composites can be made by curing stacked polyisocyanate-impregnated cellulosic sheets. Because these plural-ply composites are thicker than single plies, they are typically cured at higher pressures within the above ranges than the single-ply composites. Higher pressure enhances the interply contact and adhesion during curing.

The cover sheet material 14, both single and multiple plies, can be applied to rigid substrates such as rigid core 16. Again, core 16 may be made of a foamed plastic material such as high-density polyurethane. The thickness of the core sheet 16 can vary between about 0.25 inches to about 1.0 inches, depending on the particular application of interest. However, a preferred thickness for core sheet 16 is about 0.35 inches. Also, the density of the core preferably sheet 16 varies from about 10 pounds/inch$^3$ to about 30 pounds/inch$^3$. A preferred core density is about 15 pounds/inch$^3$. Sheet-like structures of the plastic material may be finished, such as by sanding, to achieve a flat dieboard core 16 of appropriate dimensions.

The cover sheets 14 are secured to the rigid core 16, such as by using any of a variety of adhesives known in the art. For instance, an adhesive such as MOR-AD 434 from the Morton Thiokol Corporation can be applied to the opposed major surfaces of core sheet 16. Layer 14 is then placed on the surface of the core sheet 16 bearing the adhesive. A plywood press is typically used to apply a pressure of about 75 psig to about 100 psig to the laminated cover sheet/core dieboard assembly while the adhesive cures.

Slots 18 are cut in dieboard 10 to receive rule member 20 therein. Slots 18 are illustrated as being cut through the dieboard with uncut portions of the dieboard or bridges (one being indicated at 19 in FIG. 1) being left in a conventional manner to maintain the integrity of the slotted dieboard. Slots 18 must be accurately sized so as to rigidly retain rule member 20.

Slots 18 can be introduced into dieboard 10 in any conventional manner, such as sawing. A particular feature of the present invention is to form a dieboard 10 that can be slotted at commercially viable rates with lasers known in the art. A laminated structure of cover sheets alone (without a core) which is thick enough to receive and retain the rule 20 cannot be cut at a commercially viable rate with low-wattage lasers. Such a thick polyurea cover sheet (e.g. 0.5 inches thick) can only be cut at a rate of from about 5 inches/minute to about 7 inches/minute when using a 400 to 430 watt carbon dioxide laser. PERMAPLEX dieboards, a prior art dieboard material, is also relatively difficult to cut with a laser. For example, such dieboards can be cut with a 400 watt carbon dioxide laser at about 8 inches/minute. Fifteen to 20 inches/minute or more is considered a commercially viable laser cutting rate.

A dieboard having a rigid polyurethane inner core and a cover sheet 14 of approximately 0.1 to approximately 0.15 inches, and a core of urethane of 15 pounds per cubic foot can be slotted at commercially viable rates (meaning 15 inches/minute to about 40 inches/minute) using lasers having relatively low wattage ratings. For instance, a 600 watt laser can cut a slots in such a dieboard at from about 24 to about 35 inches/minute. Plywood dieboards are also relatively easy to cut (e.g. at 36-40 inches per minutes) but suffer from other disadvantages such as a lack of dimensional stability and warpage during cutting.

For purposes of shorthand notation, the polyurea composite cover sheet material is designated P-Cel in the tables below. Tables I and II compare dieboard laser-cutting rates for P-Cel, PERMAPLEX, plywood, and P-Cel/foam core laminated dieboards (0.13 inch thick P-Cel over 0.35 inch thick urethane of a density of about 15 pounds per cubic foot). The data indicates that P-Cel alone and PERMAPLEX boards are difficult to cut. A typical cutting speed for these materials is from about 5 to about 8 inches/minute. The laminated foam core/P-Cel dieboard structure, in contrast, can be cut at a significantly faster rate. In these tables, a two point cut (1/16 inch wide) cut was made into the dieboards with the maximum cutting rate in inches per minute (IPM) for achieving a suitable slot being indicated in the table.

The data in Table I was generated using a 600 watt Lumonics carbon dioxide laser operating in continuous and pulsed wave $TEM_{00}$ mode. Five inch focal length focusing optics and copper nozzles of various diameters 3000 watt, RF excited Trumpf carbon dioxide laser operating in continuous and pulsed wave $TEM_{01}$ donut mode.

TABLE I

Comparison of Laser Cutting Data for P-Cel, Maple Plywood, and "PERMAPLEX" (2 Point Cut)

| BOARD | WATTAGE | LOCATION | NOZZLE GAP | NOZZLE ORIFICE | SPEED (IPM) |
| --- | --- | --- | --- | --- | --- |
| P-Cel | 400 | 0.0 | 0.65 | 0.05 | 5.0 |
| P-Cel | 430 | 0.0 | 0.65 | 0.05 | 7.0 |
| Permaplex X | 400 | 3.0+ | 0.65 | 0.05 | 6.0 |
| Permaplex X | 430 | 3.0+ | 0.65 | 0.05 | 8.0 |
| Plywood | 400 | 3.0+ | 0.65 | 0.05 | 36 |
| Plywood | 430 | 3.0+ | 0.65 | 0.05 | 36-40 |

TABLE II

Comparison of Laser Cutting Data for P-Cel/Foam Core and P-Cel without a Foam Core
Nozzle Orifice: 0.046 in.
Nozzle Gap: 0.026 in.
Focusing Lens: 5 in Zn—Se

| BOARD | WATTAGE | LOCATION | COVER GAS | SPEED (IPM) |
| --- | --- | --- | --- | --- |
| P-Cel with Foam Core | 400 | 0 | Nitrogen (55 psi) | 16 |
| P-Cel with Foam Core | 600 | 0 | Nitrogen | 24 |
| P-Cel with Foam Core | 1000 | 0 | Nitrogen | 40 |
| P-Cel alone | 400 | 0 | Air (80 psi) | 4 (not complete cut) |
| P-Cel alone | 600 | 0 | Air | 10 |
| P-Cel alone | 1000 | 0 | Air | 22 |

Dieboards made according to the present invention exhibit excellent strength and excellent dimensional stability and resist swelling when exposed to moisture or high humidity. A 0.625 inch P-Cel/urethane foam core dieboard made according to Example 2 below, having a total thickness of 0.642 inches and a density of 53 pounds/ft$^3$, has the following properties: a tensile strength in the machine direction (MD) of 9,226 psig, a tensile strength in the machine cross-direction (CD) of 5,951 psig; an MD flexure strength of 13,520 psig and a CD flexure strength of 11,200 psig; an MD flexure modulus of $1.3 \times 10^6$ psig and a CD flexure modulus of 779,000 psig; and an internal bond strength of 586 psig.

Table III compares selected properties of a number of materials. Birch plywood, maple plywood, and PERMAPLEX 1 and 2 (available from EHV Weidmann) have each heretofore been used as a dieboard. When immersed in a water bath for 24, 48 and 96 hours, the plywood boards absorbed substantial amounts of water. The affinity of dieboards to absorb water correlates to their dimensional stability. That is, dieboards can absorb water during use, such as from the environment, and can change dimensions depending upon the quality of absorbed water. Therefore, plywood faired poorly under these tests. PERMAPLEX 1 and 2 and a sixty-four layer of P-Cel (without foam) all exhibited good resistance to water absorption. However, these materials had a relatively high density (as compared to plywood) and correspondingly are relatively slow and costly to cut with a laser. In comparison, a dieboard of the present invention (0.13 inch thick P-Cel/foam laminated structure cover sheets of P-Cel formed using the above disclosed closed press process with 15% w/w/ resin loading and a 0.35 inch thick urethane core of 15 pounds per cubic foot density) exhibited the best water soak properties and yet had a density close to that of plywood, which confirms its susceptibility to rapid cutting using a laser. This latter dieboard absorbed no more than about four percent moisture when subjected to a water bath for ninety-six hours.

TABLE III

Dieboard Test Results

|  | Birch Plywood | Maple Plywood | PermaPlex 1 | PermaPlex 2 | P-Cel Solid | P-Cel/Foam Lamin. Struc. |
|---|---|---|---|---|---|---|
| Density (pcf) | 46.18 | 42.96 | 87.06 | 89.31 | 79.81 | 41.63 |
| Water Soak Tests: |  |  |  |  |  |  |
| Water Absorption (%) |  |  |  |  |  |  |
| 24 hours | 33.0 | 34.9 | 1.6 | 2.1 | 1.6 | 1.5 |
| 48 hours | 38.8 | 41.3 | 3.9 | 3.3 | 2.5 | 2.3 |
| 96 hours | 46.4 | 49.3 | 6.7 | 6.2 | 3.7 | 3.4 |

EXAMPLE

As a specific example, substantially delignified cellulosic sheets impregnated with PMDI using a Gravure coating process were inserted into press platens heated to a temperature of 375° F. The cellulosic sheets ranged in thickness from 0.01 to 0.012 inches. The cellulosic sheets were impregnated with 15% w/w resin relative to the weight of cellulosic material (the loading range can, for example, be as high as 30% PMDI or higher as a percentage of fiber weight). The platen press then applied a pressure of 400 psig to the resin impregnated cellulosic sheets impregnated with polyisocyanate for about ninety seconds (a period of time less than the period of time required to cure the resin). The press pressure was then released for a period of about four to about eight seconds to allow the vaporized water and carbon dioxide to escape. The platen press was then closed until a cellulosic composite core temperature of 300° F. was obtained. After such temperature was obtained, the press platens were allowed to cool until a core temperature of 150° F. was reached.

An FR 3720 urethane foam core, having a thickness of about 0.35 inches and a density of 15 pounds/ft.$^3$, was obtained from General Plastics, Tacoma, Wash. The 0.13 inch P-Cel composite was then adhered to the foam core using MOR-AD 434 adhesive. The adhesive was applied to the opposed major surfaces of the polyurethane core. The previously cured polyurea-cellulose composite sheets were placed on the opposed major surfaces of the foam core with the adhesive therebetween. The assembled dieboard was then pressed over night in a standard plywood press at 85-100 psig.

Typically, the over-all thickness of dieboards of this type range from about one-half to about one inch.

Although the principles of the invention have been described with reference to preferred embodiments, it should be apparent to one of ordinary skill in the art that the invention can be further modified in detail and arrangement without departing from such principles.

We claim as our invention all such modifications which fall within the scope of the following claims:

1. A laminated dieboard structure comprising:
a core having first and second opposed major surfaces, the core being of a plastic material of a density of from ten to thirty pounds per cubic foot;
first and second cover sheets each having opposed major surfaces, the core being positioned between respective major surfaces of the cover sheets to form the laminated structure, the cover sheets each comprising cellulosic material impregnated with a heat-curable polyisocyanate within a range of from about eight percent to about thirty percent by weight of polyisocyanate to cellulosic material, the polyisocyanate being heat cured under conditions of temperature and pressure to form a polyurea-cellulose composite.

2. A dieboard structure according to claim 1 wherein each cover sheet comprises plural plies of cellulosic material impregnated with the polyisocyanate and cured.

3. A dieboard structure according to claim 1 in which each cover sheet is from about 0.075 to about 0.2 inches thick.

4. A dieboard structure according to claim 1 in which each cover sheet is from about 0.1 to about 0.15 inches thick.

5. A dieboard structure according to claim 1 in which each cover sheet is about 0.13 inches thick and the density of the core is about fifteen pounds per cubic foot.

6. A dieboard structure according to claim 1 in which the core is of a polyurethane material.

7. A dieboard structure according to claim 1 which absorbs no more than about four percent water when soaked in a bath of water for ninety-six hours.

8. A dieboard structure according to claim 1 including a layer of a liquid and water vapor impermeable surface forming material overlaying a major surface of at least one of the cover sheets and which is exposed to the exterior of the dieboard structure.

9. A dieboard structure according to claim 8 in which the surface forming material comprises a film.

10. A dieboard structure according to claim 9 in which the film is bonded to the cover sheet during curing of the polyisocyanate.

11. A dieboard structure according to claim 10 in which the film is a polyvinyl fluoride film.

12. A dieboard structure according to claim 1 including a first layer of a liquid and water vapor impermeable surface forming material overlaying a major surface of the first cover sheet and a second layer of a liquid and water vapor impermeable surface forming material overlaying a major surface of the second cover sheet, the layers of surface forming material being exposed to the exterior of the dieboard structure.

13. A dieboard structure according to claim 12 in which the surface forming material is a light color.

14. A dieboard structure according to claim 1 having an elongated slot for receiving and retaining a rigid rule.

15. A dieboard structure according to claim 14 in which the slot is formed by a laser at a rate of from about fifteen to about forty inches per minute.

16. A dieboard structure according to claim 1 having a thickness of from about 0.5 inches to about 1 inch, a density of from about forty to about forty-three pounds per cubic foot.

17. A dieboard structure comprising:

a core of a plastic material having first and second opposed major surfaces, the core having a density of from about ten to about thirty pounds per cubic foot;

first and second cover sheets each having opposed major surfaces, the first cover sheet being secured to and overlaying the first major surface of the core, the second cover sheet being secured to and overlaying the second major surface of the core, each of the cover sheets comprising cellulosic material impregnated with a heat-curable polyisocyanate within a range of about 8 percent to about 30 percent by weight of polyisocyanate to cellulosic material, the polyisocyanate being heat cured to form a polyurea composite; and a liquid and water vapor impermeable surface forming material overlaying a major surface of each of the cover sheets and being exposed to the exterior of the dieboard structure.

18. A dieboard structure according to claim 17 having slots or notches for receiving and retaining rigid rule.

19. A dieboard structure according to claim 18 in which the cover sheets comprise plural plies of cellulosic sheet material, each cover sheet having a thickness of from about 0.1 to about 0.15 inches.

20. A dieboard structure comprising:

a core of a plastic material having first and second opposed major surfaces, the core having a density of from about ten to about thirty pounds per cubic foot; and a cover sheet having first and second major surfaces, the first major surface of the cover sheet overlaying one of the first and second opposed major surfaces of the core to form the dieboard structure, the cover sheet comprising cellulosic material impregnated with a heat-curable polyisocyanate, the polyisocyanate being heat cured.

21. A dieboard structure according to claim 20 including a liquid and water vapor impermeable surface forming material overlaying the second major surface of the cover sheet.

* * * * *